Patented Apr. 21, 1936

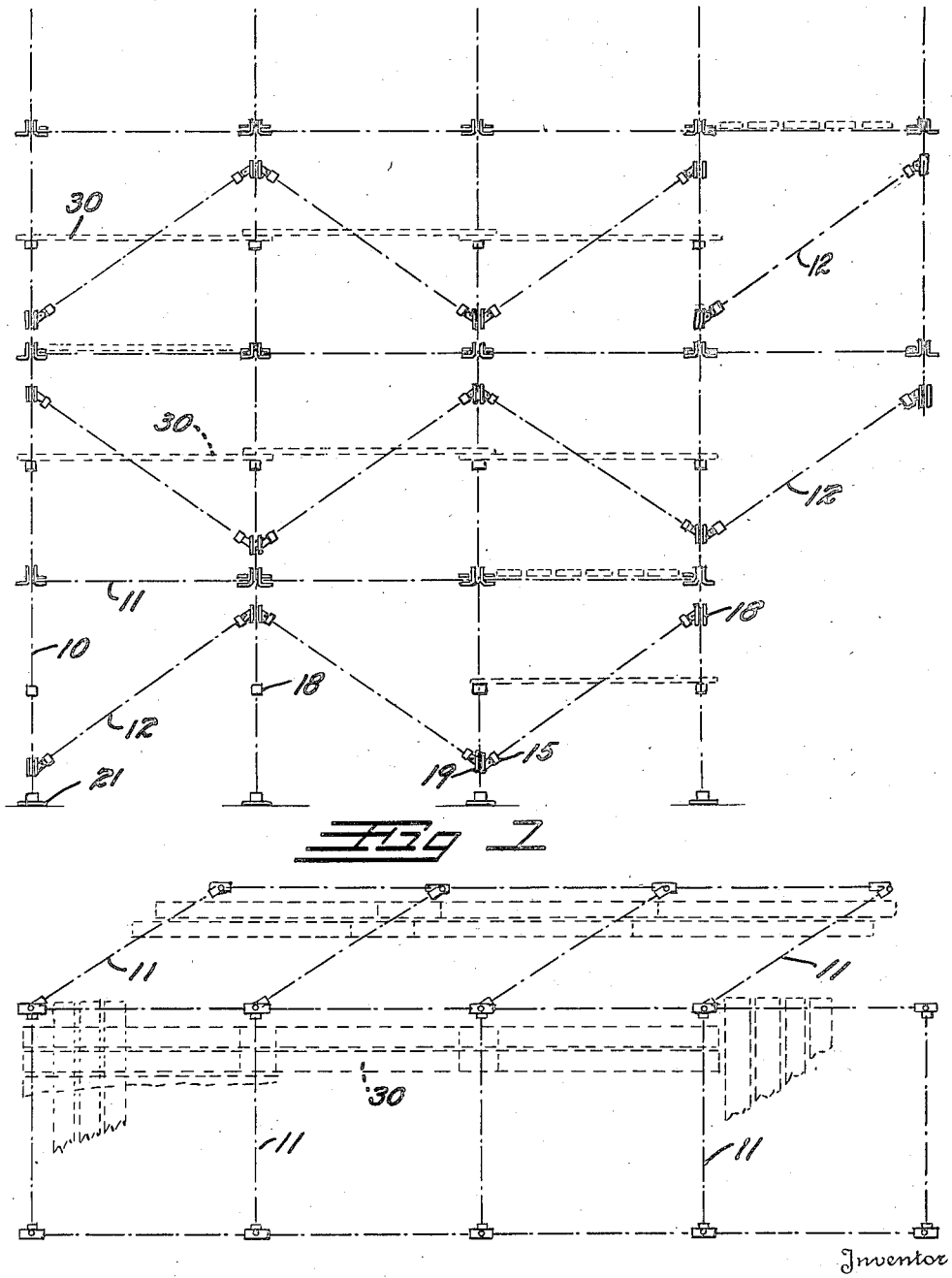

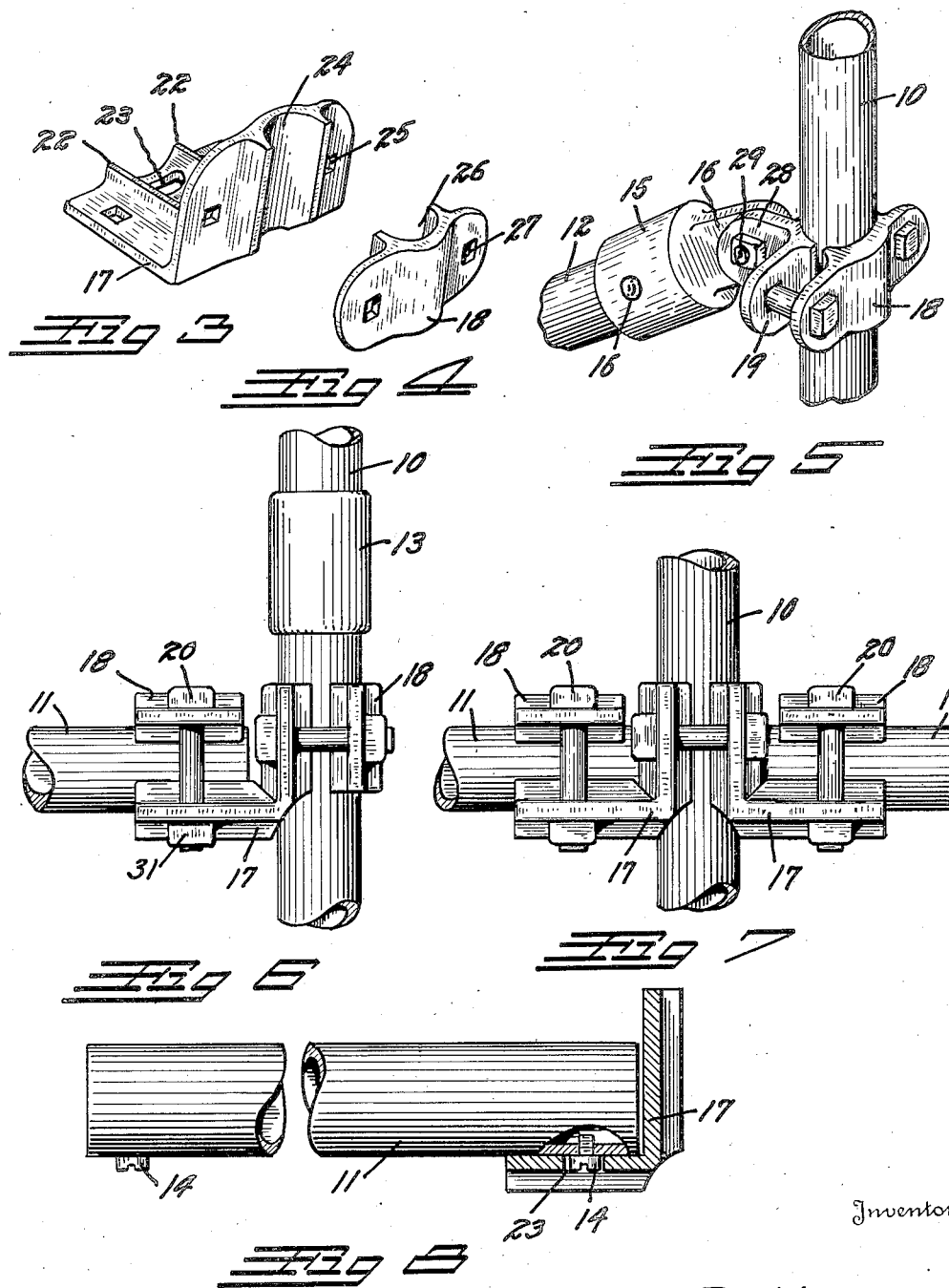

2,037,980

UNITED STATES PATENT OFFICE 2,037,980

SECTIONAL PIPE SCAFFOLDING

Edwin B. Heartz, Denver, Colo.

Application September 24, 1934, Serial No. 745,189

2 Claims. (Cl. 304—40)

This invention relates to a portable scaffold structure, more particularly designed for use in cleaning, painting and repairing large high, ceilinged rooms in buildings, such as libraries, capitol buildings, museums, etc.

The principal object of the invention is to provide a series of scaffold members and fittings therefor, which can be quickly and easily set up in various combinations to suit buildings of various shapes, contours, sizes, etc.

A further object of the invention is to so construct the connecting devices or fittings that they will not allow the scaffold structure to collapse even though they may become accidentally loosened.

A further object of the invention is to so design the connecting members that but a minimum of different shaped parts will be required to obtain a maximum of different kinds of connections.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a diagrammatic elevation illustrating a vertical elevation of a typical set up of the improved scaffold.

Fig. 2 is a diagrammatic plan view of the set up of Fig. 1.

Fig. 3 is a perspective view of what will be herein designated as the angle fitting.

Fig. 4 is a similar view of the clamping cap.

Fig. 5 is a perspective view illustrating the angle fitting in a typical position.

Fig. 6 is a side view of the angle fitting attaching a single horizontal member to a vertical member.

Fig. 7 is a similar view of a connection between two horizontal members and a single vertical member.

Fig. 8 is a detail view of the joint between a horizontal member and the angle fitting.

The main scaffold members comprise a series of lengths of pipe or tubing. It is preferred to employ members of only three standard lengths, one as indicated at 10 for the vertical standards, one at 11 for the horizontal members, and one at 12 for the diagonal members. It has been found that with these three lengths of members, scaffolds may be constructed to fit any structural conditions which may be encountered.

The vertical members 10 are connected together to any desired heighth by means of standard screw pipe couplings 13. The horizontal members 11 carry at their extremities projections which may be formed by threading fillister headed screws 14 into them. The diagonal members 12 terminate in eye fittings 15 riveted thereon by means of a suitable rivet 16. The fittings 15 are cast with a projecting eye plate 16.

In addition to the above described members, only three loose fittings are employed. These comprise a 90° angle plate or angle fitting 17 as shown in Fig. 3; a clamping cap 18, as shown in Fig. 4, and an eye fitting 19. With these fittings and members together with suitable clamp bolts 20, any desired scaffold structure may be erected. If desired, the vertical lengths 11 may be rested at the bottom in flange fittings 21 to protect the floors, etc., although these are not absolutely necessary.

The angle fitting 17 comprises two surfaces positioned at right angles to each other to form a horizontal and a vertical portion. The horizontal portion carries two enclosing ridges 22 in its upper surface, outlining a cylindrical concavity for receiving the extremity of a horizontal member 11. A slotted hole 23 is formed in the bottom of the concavity for receiving the head of the screw 14. The outer face of the vertical portion also contains a cylindrical concavity 24 for partially enclosing a vertical member 10. The fitting is provided with suitable square bolt holes 25.

The cap plate 18 is provided with a similar cylindrical concavity 26, and similar square bolt holes 27. The eye fitting 19 contains a similar concavity and similar bolt holes, and is provided with a projecting eye plate 28 through which a pivot bolt 29 may be passed.

In erecting a scaffold, it is preferred to position the horizontal members 11 at regular elevations as shown in Fig. 1 along the length of the scaffold, and to position similar horizontal members 11 laterally of the scaffold midway between the first members 11. This arrangement gives two elevations for each space upon which the workmen's planks, indicated at 30 may be placed. At frequent intervals, the diagonal members 12 are placed so as to brace the entire structure against side sway.

In connecting a horizontal member 11 to a vertical member 10, the end of the horizontal member is placed in the concavity between the ridges 22 with its screw 14 in the hole 23. One of the cap members 18 is then clamped against the extremity by means of the bolts 20. The vertical portion of the angle member can then be clamped to the vertical member 10 by means of another cap member 18, as shown in Fig. 6, or by means of another angle member as shown in Fig. 7. The latter is used where it is desired to continue the run of the horizontal members 11.

It will be noted that even though the bolts 20 may become loosened, the members can not pull apart since the heads of the screws 14 will still be in engagement with the holes 23.

The diagonal lengths 12 are connected to the vertical members 10, as shown in Fig. 5, or to the horizontal members 11. In making this connection, the two eye plates 16 and 28 are clamped together by means of the pivot bolt 29, and the eye fitting 19 is clamped to the pipe member either by means of one of the cap members 18 on one of the angle members 17. The spacing of the bolt holes 27 is uniform in all members so that any two members may be used together.

It is preferred to use bolts of the "carriage" type, that is, bolts having a square shank immediately beneath the head. This square shank fits snugly into the square holes so as to hold the bolt from turning while their nuts 31 are tightened.

In some installations, there may not be sufficient room between the scaffold position, and the room wall to accommodate the standard length of the lateral horizontal members 11. It is of course not desirable to cut these members to fit particular installations, and it is not necessary to cut them with the present invention. Such a situation is met, as shown in Fig. 2, by swinging the lateral horizontal members to one side to reduce the width of the scaffold to the desired amount. The fittings allow the members to be swung in any direction to any desired angle before clamping them in place.

In some installations, cornices, balconies, etc., prevent the vertical members from being extended entirely to the floor. In such installations, a bracket may be formed, as shown at the right of Fig. 1, so that the weight of the unsupported extremity will be transmitted by means of the diagonal members 12 to the main structure. In fact, any desired shape, size, or form of scaffolding may be made with these simple members and fittings.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In a scaffold structure formed of horizontal and vertical tubular members, means for securing the extremity of a horizontal member to a vertical member comprising: an angle plate; a horizontal portion on said angle plate; a vertical portion on said angle plate; a groove in the top of said horizontal portion for receiving the extremity of a horizontal member, said vertical portion extending upwardly from the grooved face of said horizontal portion so as to extend past the horizontal member when in place therein; a grooved surface in the outer face of said vertical portion for receiving a vertical member; means for clamping said members in place on said grooved faces, there being an opening formed through said horizontal portion; and a fixed projection for attachment to the horizontal member, said projection extending into said opening to prevent longitudinal movement of said horizontal member on said grooved surface.

2. A joint for connecting horizontal members to vertical members in a scaffold structure comprising: two L-shaped plates; means for clamping the vertical portions of said plates against the sides of a vertical member, there being grooves in the upper faces of the horizontal portions of said plates for receiving the extremities of horizontal members; clamping caps positioned over the horizontal portions; means for clamping said caps against said horizontal members; projections extending downwardly from said horizontal members; and engaging openings in said horizontal portions to prevent the horizontal members from being drawn from beneath said caps.

EDWIN B. HEARTZ.